(12) United States Patent
Zhang et al.

(10) Patent No.: US 11,016,500 B2
(45) Date of Patent: May 25, 2021

(54) SIMULATION-BASED METHOD TO EVALUATE PERCEPTION REQUIREMENT FOR AUTONOMOUS DRIVING VEHICLES

(71) Applicant: Baidu USA LLC, Sunnyvale, CA (US)

(72) Inventors: Liangliang Zhang, Sunnyvale, CA (US); Kairui Yang, Sunnyvale, CA (US); Jiangtao Hu, Sunnyvale, CA (US)

(73) Assignees: BAIDU USA LLC, Sunnyvale, CA (US); BAIDU.COM TIMES TECHNOLOGY (BEIJING) CO., LTD., Bejing (CN)

( * ) Notice: Subject to any disclaimer, the term of this patent is extended or adjusted under 35 U.S.C. 154(b) by 224 days.

(21) Appl. No.: 15/772,525

(22) PCT Filed: Mar. 8, 2018

(86) PCT No.: PCT/CN2018/078423
§ 371 (c)(1),
(2) Date: Apr. 30, 2018

(87) PCT Pub. No.: WO2019/169604
PCT Pub. Date: Sep. 12, 2019

(65) Prior Publication Data
US 2019/0278290 A1    Sep. 12, 2019

(51) Int. Cl.
*G05D 1/02*    (2020.01)
*G05D 1/00*    (2006.01)
(Continued)

(52) U.S. Cl.
CPC ........... *G05D 1/0257* (2013.01); *G01C 21/32* (2013.01); *G01S 7/40* (2013.01); *G01S 13/931* (2013.01);
(Continued)

(58) Field of Classification Search
USPC ......................................................... 701/23
See application file for complete search history.

(56) References Cited

U.S. PATENT DOCUMENTS

| | | | |
|---|---|---|---|
| 2017/0185089 A1* | 6/2017 | Mei | G05D 1/0088 |
| 2018/0107770 A1* | 4/2018 | Cahoon | G06F 30/15 |
| 2018/0349526 A1* | 12/2018 | Atsmon | G06F 30/20 |

FOREIGN PATENT DOCUMENTS

| | | |
|---|---|---|
| CN | 104787044 | 7/2015 |
| CN | 10658623 | 4/2017 |
| CN | 107145147 | 9/2017 |

* cited by examiner

*Primary Examiner* — Maceeh Anwari
(74) *Attorney, Agent, or Firm* — Womble Bond Dickinson (US) LLP

(57) ABSTRACT

In one embodiment, a system is designed to determine the requirement of a perception range for a particular type of vehicles and a particular planning and control technology. A shadow filter is used to connect a scenario based simulator and a PnC module, and tuning the parameters (e.g. decreasing the filter range, tuning the probability of obstacles to be observed among frames) of shadow filter to mimic the real world perceptions with a limited range and reliabilities. Based on the simulation results (e.g., a failure rate, smoothness, etc.), the system is able to determine the required perception distance for the current PnC module. A PnC module represents a particular autonomous driving planning and control technology for a particular type of autonomous driving vehicles. Notice that the PnC module is replaceable so that this method is suitable for different PnC algorithms representing different autonomous driving technologies.

20 Claims, 10 Drawing Sheets

(51) Int. Cl.
*G06K 9/00* (2006.01)
*G01S 13/931* (2020.01)
*G01S 7/40* (2006.01)
*G01C 21/32* (2006.01)

(52) U.S. Cl.
CPC ....... *G05D 1/0088* (2013.01); *G06K 9/00805* (2013.01); *G01S 2013/9323* (2020.01); *G05D 2201/0213* (2013.01)

SIMULATION-BASED METHOD TO EVALUATE PERCEPTION REQUIREMENT FOR AUTONOMOUS DRIVING VEHICLES

CROSS-REFERENCE TO RELATED APPLICATION

This patent application is a U.S. National Phase Application under 35 U.S.C. § 371 of International Application No. PCT/CN2018/078423, filed Mar. 8, 2018, entitled "SIMULATION-BASED METHOD TO EVALUATE PERCEPTION REQUIREMENT FOR AUTONOMOUS DRIVING VEHICLES," which is incorporated by reference herein by its entirety.

TECHNICAL FIELD

Embodiments of the present disclosure relate generally to operating autonomous vehicles. More particularly, embodiments of the disclosure relate to determining perception requirement of autonomous driving vehicles using simulation.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. The planning and control are performed based on the perception information that perceives or observes the driving environment surrounding an autonomous driving vehicle (ADV), which may be provided by the perception sensors mounted on the vehicle. Different perception sensors with different design specifications from different sensor providers or manufacturers may behave differently (e.g., different sensitivities or scanning ranges).

The vehicle designers may have to determine what kinds of sensors to use for the vehicles in view of the planning and control technology used to drive the vehicles. How far a perceptron module needs to reliably observe is one of the key factors that affects the selection decision of perception sensors. Meanwhile, different sensors are associated with different costs to manufacture or purchase. Requiring a longer or farther perception range usually incurs a higher cost, while a shorter perception range could increase the blind areas and increase the probability of car accident. How to make a balanced decision on the type of sensors is a very challenging issue to deal with.

Conventional attempts to solve the above problems are based on human's empirical experience. It is not reliable, and can bring either waste of money or unsuitable for a planning and control module to drive the vehicle safely. Further, the requirement of perception range is highly related to the specific planning and control (PnC) modules of autonomous driving technologies, but the conventional attempts cannot make proper evaluation based on PnC modules.

SUMMARY

In an aspect of the disclosure, embodiments of the disclosure provide a computer-implemented method for determining perception ranges required for an autonomous driving vehicle, the method including: defining a first set of virtual obstacles arranged at a plurality of different locations relative to a current location of an autonomous driving vehicle (ADV); defining a plurality of sets of perception parameters associated with one or more perception sensors of the ADV; for each set of the perception parameters, performing a filtering operation on the first set of virtual obstacles based on the set of the perception parameters to determine a second set of virtual obstacles, the second set of virtual obstacles being a subset of the first set of virtual obstacles, and performing a planning and control simulation to plan a trajectory and control the ADV to move according to the trajectory in view of the second set of virtual obstacle; and selecting a first set of perception parameters from the plurality of sets of perception parameters based on the planning and control simulation, wherein the first set of perception parameters is to be applied to the perception sensors of the ADV.

In another aspect of the disclosure, embodiments of the disclosure provide a non-transitory machine-readable medium having instructions stored therein, which when executed by a processor, cause the processor to perform operations, the operations including: defining a first set of virtual obstacles arranged at a plurality of different locations relative to a current location of an autonomous driving vehicle (ADV); defining a plurality of sets of perception parameters associated with one or more perception sensors of the ADV; for each set of the perception parameters, performing a filtering operation on the first set of virtual obstacles based on the set of the perception parameters to determine a second set of virtual obstacles, the second set of virtual obstacles being a subset of the first set of virtual obstacles, and performing a planning and control simulation to plan a trajectory and control the ADV to move according to the trajectory in view of the second set of virtual obstacle; and selecting a first set of perception parameters from the plurality of sets of perception parameters based on the planning and control simulation, wherein the first set of perception parameters is to be applied to the perception sensors of the ADV.

In another aspect of the disclosure, embodiments of the disclosure provide a data processing system, including: a processor; and a memory coupled to the processor to store instructions, which when executed by the processor, cause the processor to perform operations, the operations including defining a first set of virtual obstacles arranged at a plurality of different locations relative to a current location of an autonomous driving vehicle (ADV), defining a plurality of sets of perception parameters associated with one or more perception sensors of the ADV, for each set of the perception parameters, performing a filtering operation on the first set of virtual obstacles based on the set of the perception parameters to determine a second set of virtual obstacles, the second set of virtual obstacles being a subset of the first set of virtual obstacles, and performing a planning and control simulation to plan a trajectory and control the ADV to move according to the trajectory in view of the second set of virtual obstacle, and selecting a first set of perception parameters from the plurality of sets of perception parameters based on the planning and control simulation, wherein the first set of perception parameters is to be applied to the perception sensors of the ADV.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
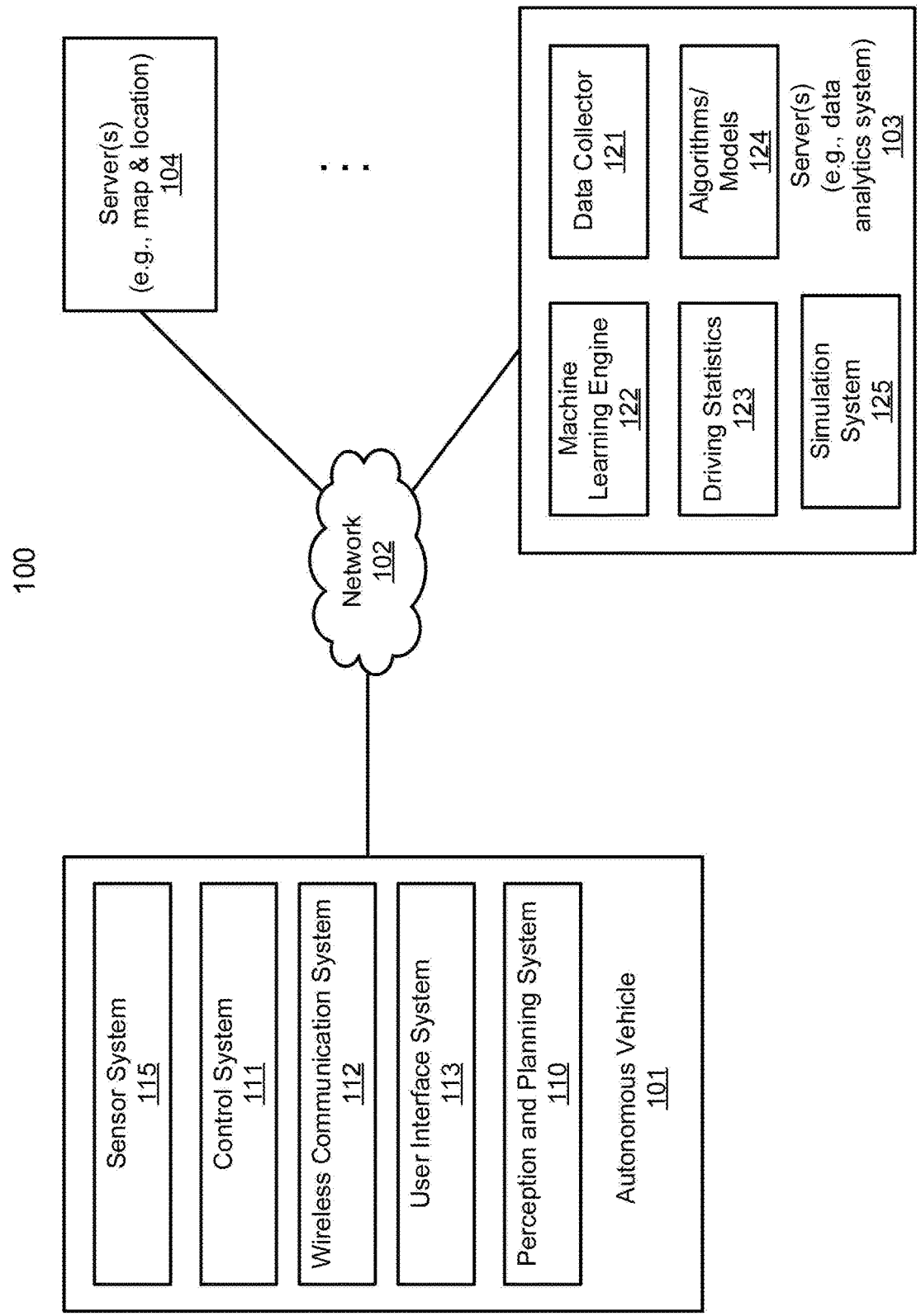
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, a system is designed to determine the requirement of a perception range for a particular type of vehicles and a particular planning and control technology. A shadow filter is used to connect a scenario based simulator and a PnC module, and tuning the parameters (e.g. modifying the filter range, tuning the probability of obstacles to be observed among frames) of shadow filter to mimic the real world perceptions with a limited range and reliabilities. Based on the simulation results (e.g., a failure rate, smoothness, etc.), the system is able to determine the required perception distance for the current PnC module. A PnC module represents a particular autonomous driving planning and control technology for a particular type of autonomous driving vehicles. The PnC module includes autonomous driving algorithms executed therein to plan and control the ADVs' driving operations. Note that the PnC module is replaceable so that this method is suitable for different PnC algorithms representing different autonomous driving technologies.

According to one embodiment, a scenario based simulation engine is used, which can simulate hundreds of thousands of driving scenarios. A driving scenario can be driving straight, changing lanes, turning (e.g., left, right, u-turn), intersection, merging, etc., with certain obstacles (e.g., vehicles, pedestrians, cycles, static objects such as building or light poles). In each scenario, the ideal perception is connected with a shadow filter, where the ideal perception includes a set of virtual obstacles disposed at different locations and distances. A shadow filter can filter out (in view of perception probability associated with a particular planning and control technology) the obstacles based on the current states of an ADV or a type of ADVs and perception parameters. The current states of ADV include a heading direction, a position, a speed, etc. of the ADV. The perception parameters include range to filter (i.e., when an obstacle's distance is larger than a specific distance from the autonomous driving vehicle, it will be filtered out) and probability to filter (i.e., when an obstacle's distance is smaller than a specific distance, it will have some frames to be filtered out. This probability changes according to the relative direction and distance between an obstacle and the ADV. A PnC module is connected to the shadow filter, so that in PnC module, only the filtered obstacles are available or visible in terms of perception. An evaluator is running in parallel to the simulation engine to collect and evaluate simulation results to determine if the ADV operates safely and if the trajectory smoothness is within acceptable ranges. A range determination module analyzes the evaluation results and properly selects a smallest or shortest perception range that the ADV can still operate safely and people still feel comfortable to sit on it. The selected perception range can be utilized to determine and acquire perception sensors to be utilized in ADVs subsequently.

In a particular embodiment, a first set of virtual obstacles is defined and disposed at different locations relative to a current location of an ADV (e.g., a virtual ADV). An obstacle may represent a pedestrian, a biker, a vehicle, or a static object (e.g., non-moving obstacle). A number of sets of perception parameters associated with one or more perception sensors of the ADV are defined. A perception parameter refers to a scanning distance and/or a scanning angle, which represents a scanning range or scanning area a perception sensor is able to cover to observe an obstacle. For each set of the perception parameters, a filtering operation is performed on the first set of virtual obstacles based on the corresponding set of perception parameters to determine a second set of the virtual obstacles from the first set. The second set is a subset of the first set of virtual obstacles that fall within a scanning area defined by the perception parameters. A planning and control simulation is performed using a planning and control technology or algorithm to plan a trajectory and control the ADV to move according to the trajectory in view of the second set of virtual obstacles. The planning and control simulation may be performed under a variety of driving scenarios, which may be preconfigured for the purpose of simulation. Thereafter, a first set of perception parameters is selected from the sets of perception parameters based on the planning and control simulation. The selected first set of perception parameters may be utilized to identify and select perception sensors for that particular type of vehicles and particular planning and control technology.

In one embodiment, for each set of perception parameters, the result of the corresponding simulation is evaluated to determine whether the ADV has successfully navigated through the second set of virtual obstacles in view of a predetermined set of rules (e.g., traffic rules). The first set of perception parameters are selected such that the ADV has successfully navigated the second set of virtual obstacles, for example, without an accident (e.g., collision with or too close to an obstacle). The set of rules may include the minimum distance between the ADV and each virtual obstacle when the ADV navigates through the obstacle, a relative position of the ADV within a lane based on the map data, and a range of relative speeds between the ADV and the virtual obstacle. The perception sensors may include a RADAR device and a LIDAR device, which will be described in details below.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
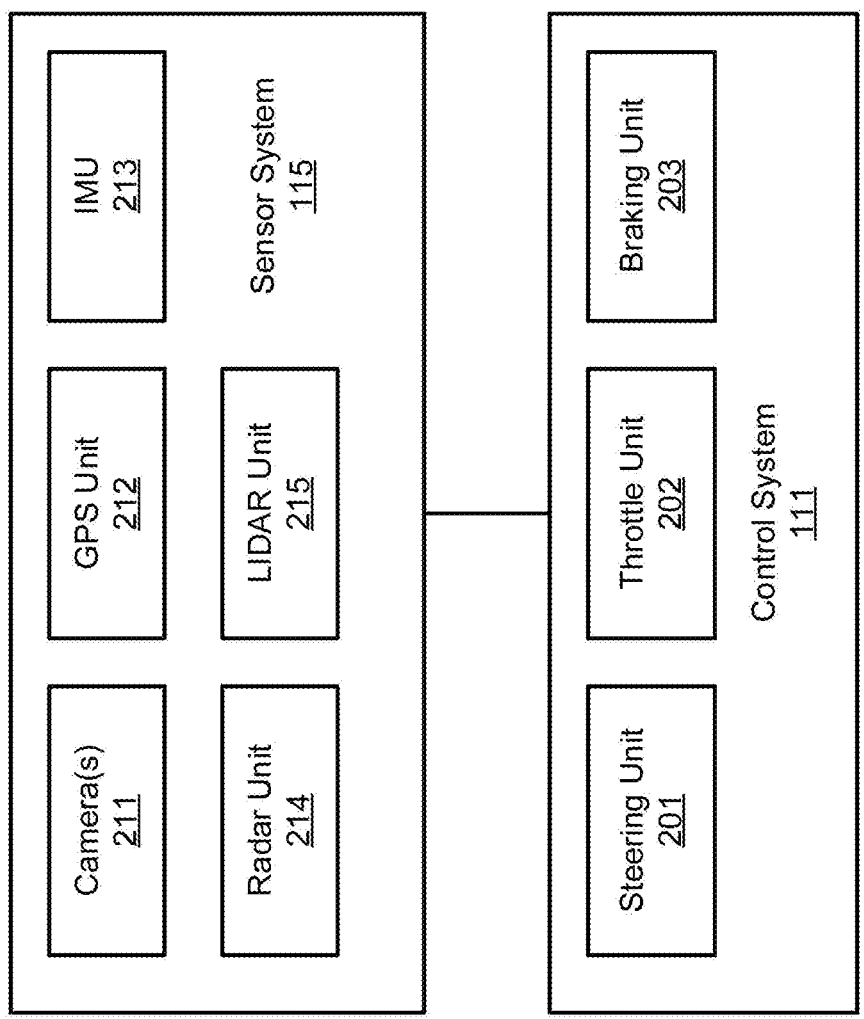
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, data 124 further include a set of perception parameters associated with a variety of perception sensors, planning and control technologies or algorithms, a set of driving scenarios for simulations, as well as a set of rules to evaluate the results of simulations to determine a proper or optimal set of perception parameters for selecting the perception sensors. Autonomous driving simulation system 125 is configured to perform autonomous driving simulations based on the perception parameter candidates under different driving scenarios for a variety of planning and control technologies.

In one embodiment, in each scenario, the ideal perception is connected with a shadow filter of simulation system 125, where the ideal perception includes a set of virtual obstacles disposed at different locations and distances. The shadow filter can filter out (in view of perception probability associated with a particular planning and control technology) the obstacles based on the current states of an ADV or a type of ADVs and perception parameters. The current states of ADV include a heading direction, a position, a speed, etc. of the ADV. The perception parameters include range to filter (i.e., when an obstacle's distance is larger than a specific distance from the autonomous driving vehicle, it will be filtered out) and probability to filter (i.e., when an obstacle's distance is smaller than a specific distance, it will have some perception frames to be filtered out. This probability changes according to the relative direction and distance between an obstacle and the ADV. A PnC module of simulation system 125 is connected to the shadow filter, so that in PnC module, only the filtered obstacles are available or visible in terms of perception. An evaluator of simulation system 125 is running in parallel to the simulation engine to collect and evaluate simulation results to determine if the ADV operates safely and if the trajectory smoothness is within acceptable ranges. A range determination module of simulation system 125 analyzes the evaluation results and properly selects a smallest perception range that the ADV can still operate safely and people still feel comfortable to sit on it.

Figure 3A:
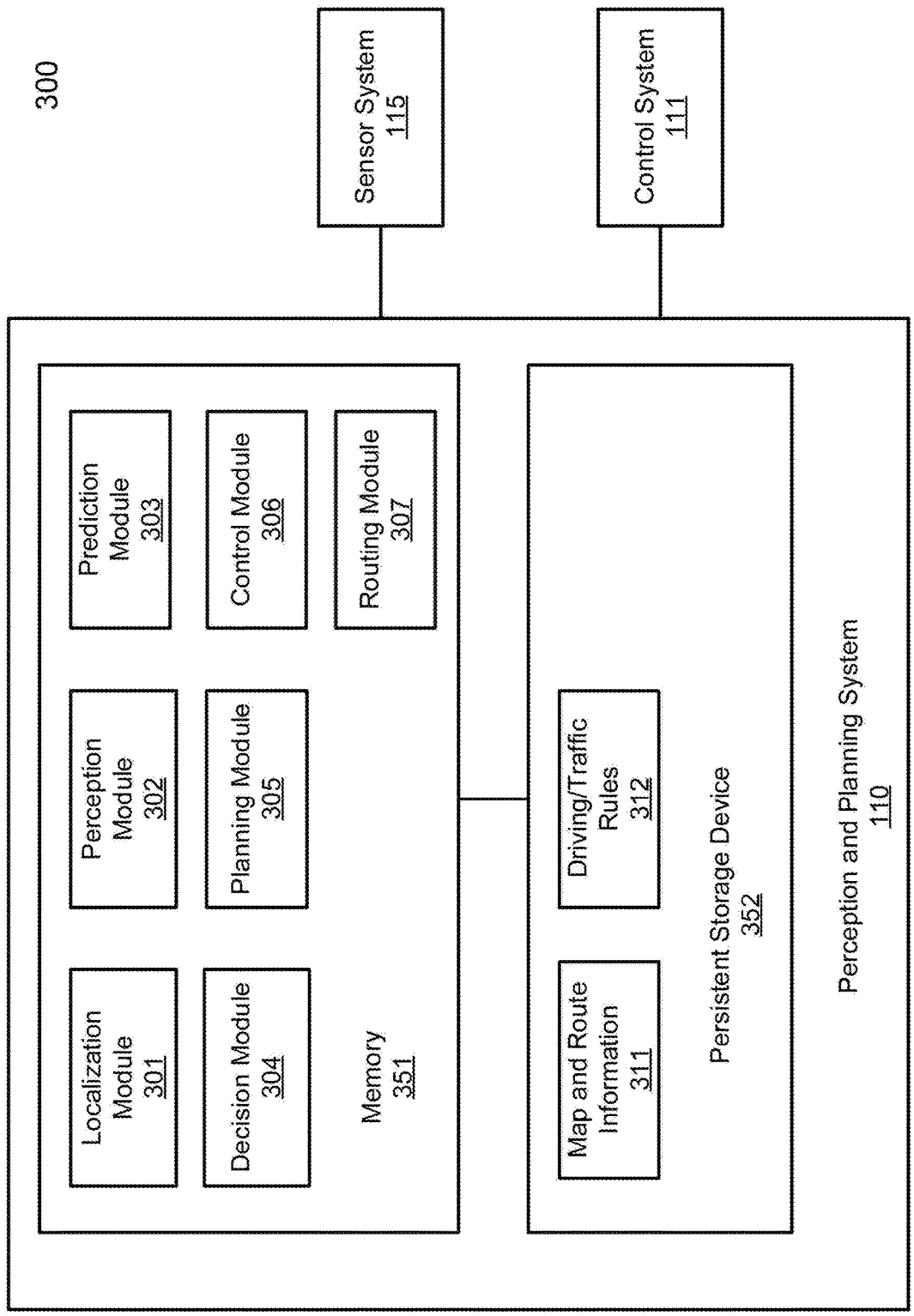
FIGS. 3A-3B are block diagrams illustrating an example of a perception and planning system used with an autonomous vehicle according to one embodiment.
Figure 3B:
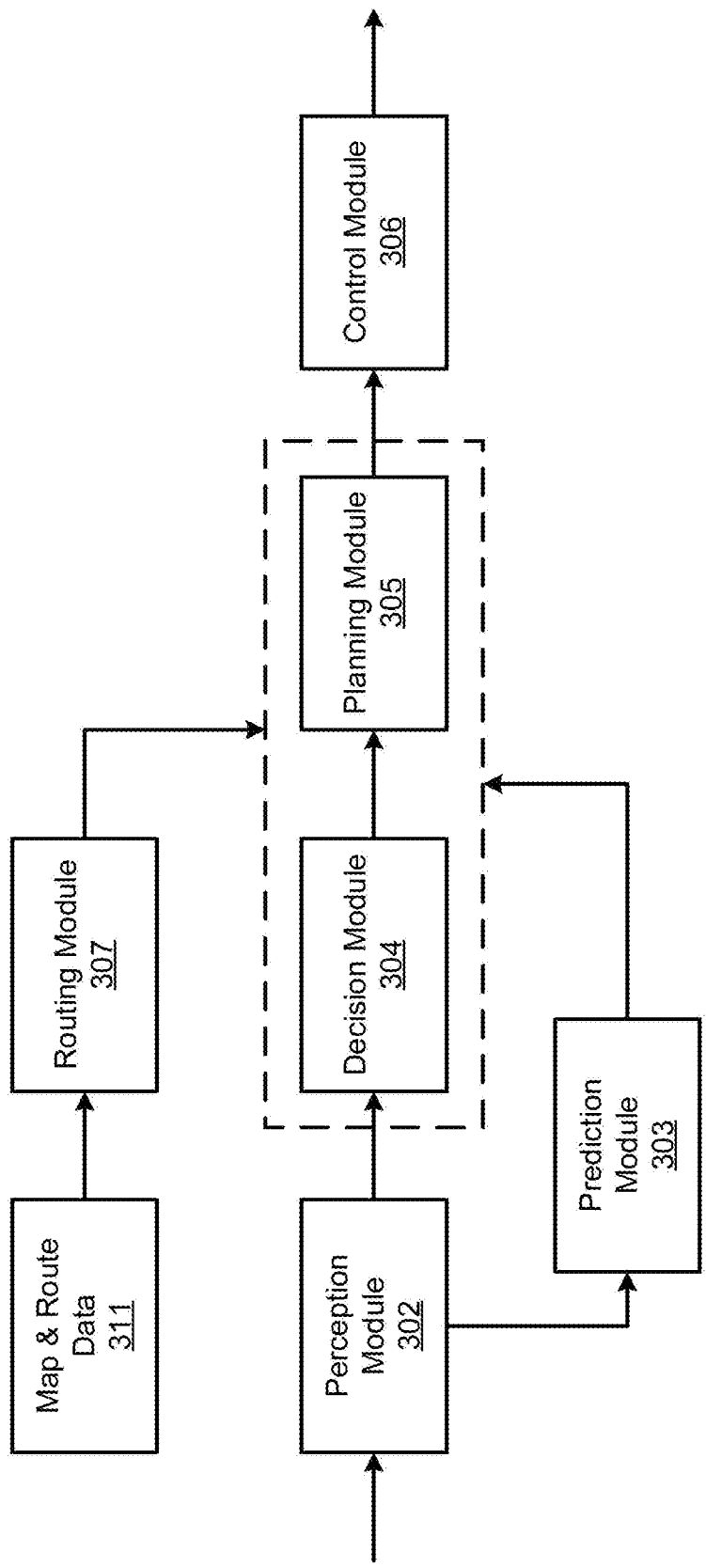

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, and routing module 307.

Some or all of modules 301-307 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal route in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route.

In one embodiment, the planning phase is performed in a number of planning cycles, also referred to as command cycles, such as, for example, in every time interval of 100 milliseconds (ms). For each of the planning cycles or command cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Decision module 304/planning module 305 may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

Figure 4A:
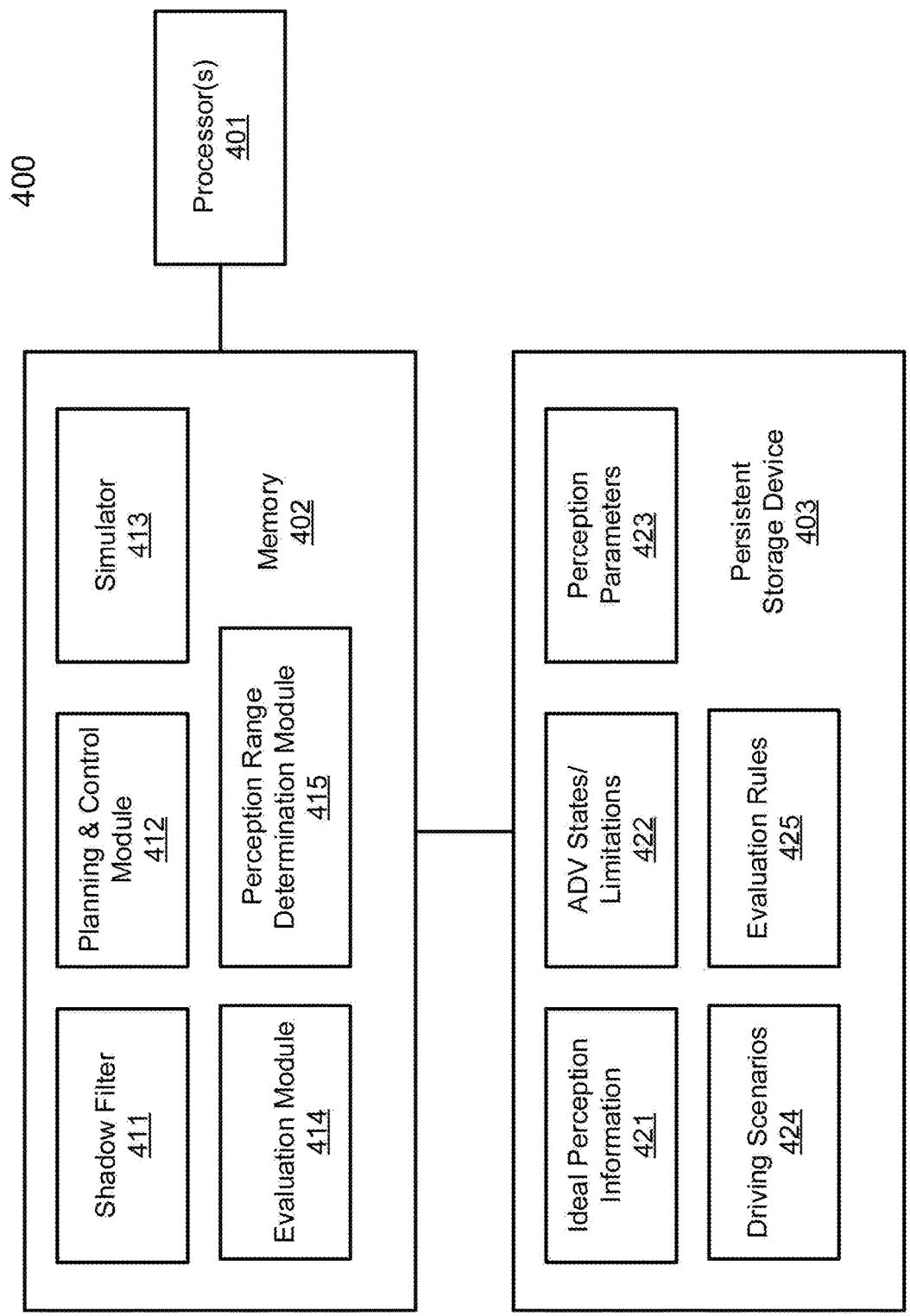
FIGS. 4A-4B are block diagrams illustrating an example of a perception simulation system according to one embodiment.
Figure 4B:
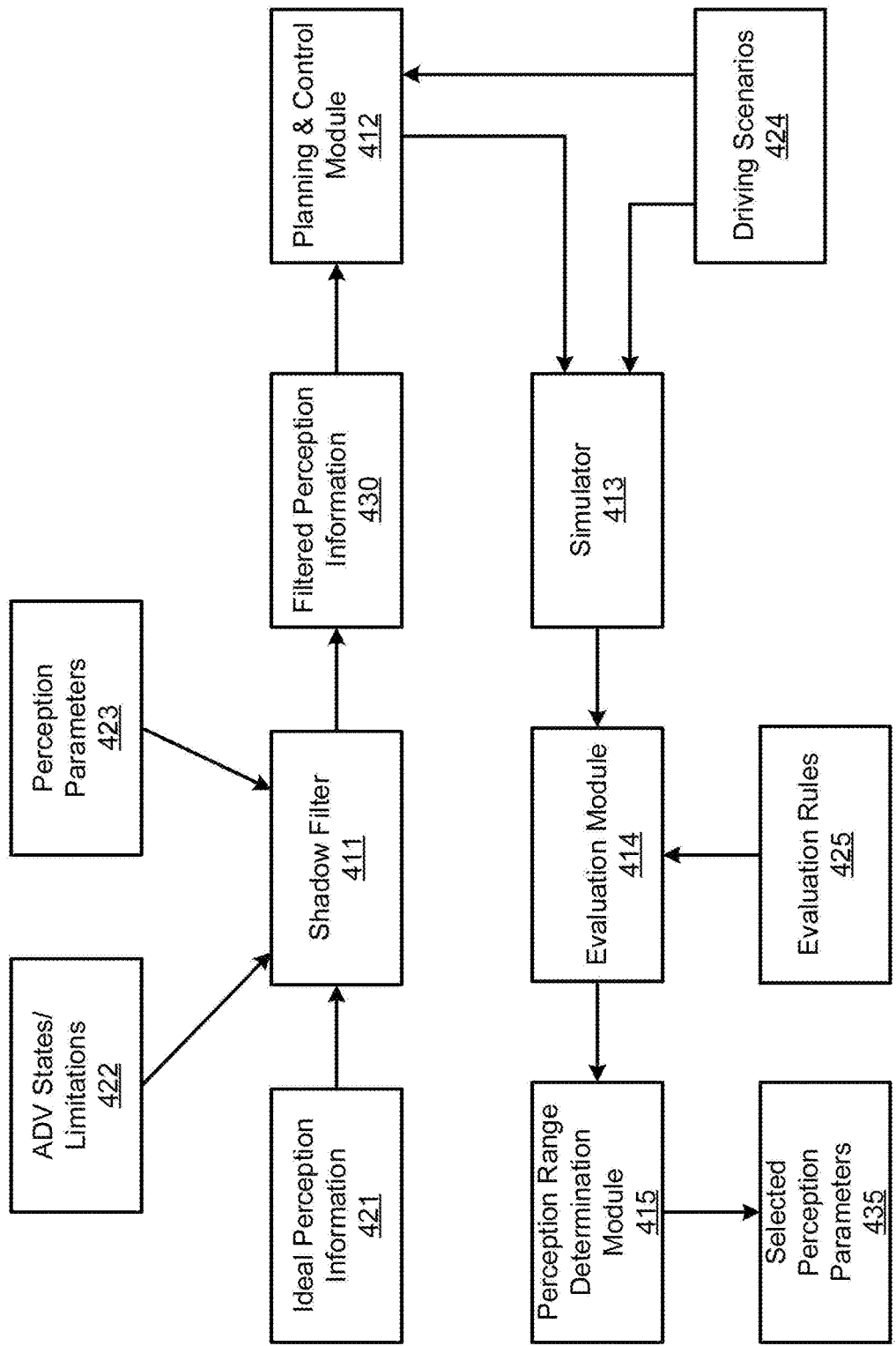

FIGS. 4A and 4B are block diagrams illustrating an example of a simulation system according to one embodiment. Simulation system 400 may represent simulation 125 of FIG. 1. Simulation system 400 is designed to perform an autonomous driving simulation for a particular vehicle and a particular planning and control technology to determine a set of perception parameters for the perception sensors of the vehicle with minimum or reasonable cost, while allowing the vehicle to drive safely and comfortably. Referring to FIGS. 4A and 4B, simulation system 400 includes, but is not limited to, shadow filter 411, PnC module 412, scenario-based simulator 413, evaluation module 414, and perception range determination module 415. Modules 411-415 may be loaded into memory 402 and executed by one or more processors 401. PnC module 412 may include at least some of the functionalities of planning module 305 and/or control module 306.

In one embodiment, prior to the simulation, a set of ideal perception data is defined and created, which may be stored as a part ideal perception 421 stored in persistent storage device 403. Ideal perception 421 may include a number of virtual obstacles that are positioned in a variety of locations with respect to a current location of an ADV of which a simulation is to be performed. Some of the virtual obstacles may be located at different locations (e.g., different x and y coordinates) with respect to the current location of the ADV of the simulation.

In addition, a set of vehicle states and driving limitations 422 of an ADV is also defined. The driving limitations may be related to specification of the ADV in question or a specific type of vehicles. In one embodiment, the driving limitations include a maximum acceleration (and/or deceleration) rate, a maximum steering angle changing rate, a minimum turning radius, and/or a physical dimension of the vehicle (e.g., vehicle length and vehicle width) of the ADV. Vehicle states of a vehicle include a current speed, heading direction, location (e.g., x, y coordinates) of the vehicle. Vehicle states and driving limitations 422 can be utilized for planning and control operations during the simulation.

Further, a number of sets of perception parameters 423 are also defined, which may be used as candidate sets of perception parameters during the simulation. One of the purposes of the simulation is to find an optimal set of perception parameters for the perception sensors with the least or reasonable cost, while still allowing an ADV on which the perception sensors are mounted to drive safely and comfortably. Each set of perception parameters includes information defining a scanning area that can be covered by a perception sensor. In one embodiment, each set of perception parameters includes a scanning distance of a RADAR device such as a radius (R) of the scanning circle of the RADAR device. Given the nature of a RADAR device that can rotate and scan in 360 degrees, the scanning angle of a RADAR device is 360 degrees. Each set of perception parameters may further include a scanning distance (L) and a scanning angle ($\theta$) of a LIDAR device.

A combination of a scanning distance and a scanning angle defines a scanning range or a scanning area that a perception sensor can scan and observe obstacles. Any obstacle falling within the scanning area can be considered visible to the perception sensors. Each set of perception parameters further includes a perception probability representing a probability or a success rate of the perception sensors capable of "seeing" or observing an obstacle that falls within the scanning area of the perception sensors. Thus, each of the candidate sets of perception parameters has a different combination of a scanning radius R of a RADAR device, a scanning distance L of a LIDAR device, and a scanning angle $\theta$ of a LIDAR device. Throughout this application, a RADAR device and a LIDAR device are utilized as examples of perception sensors. However, other sensors such as cameras or infrared sensors can also be applicable.

According to one embodiment, for each set of perception parameters 423, shadow filter 411 is configured to filter the virtual obstacles of ideal perception 421 (e.g., a first set of virtual obstacles) based on the perception parameters of the set to generate a subset of virtual obstacles (e.g., a second set of obstacles). The virtual obstacles in the subset are the ones falling within a scanning area or scanning range defined by the current set of perception parameters.

Figure 5:
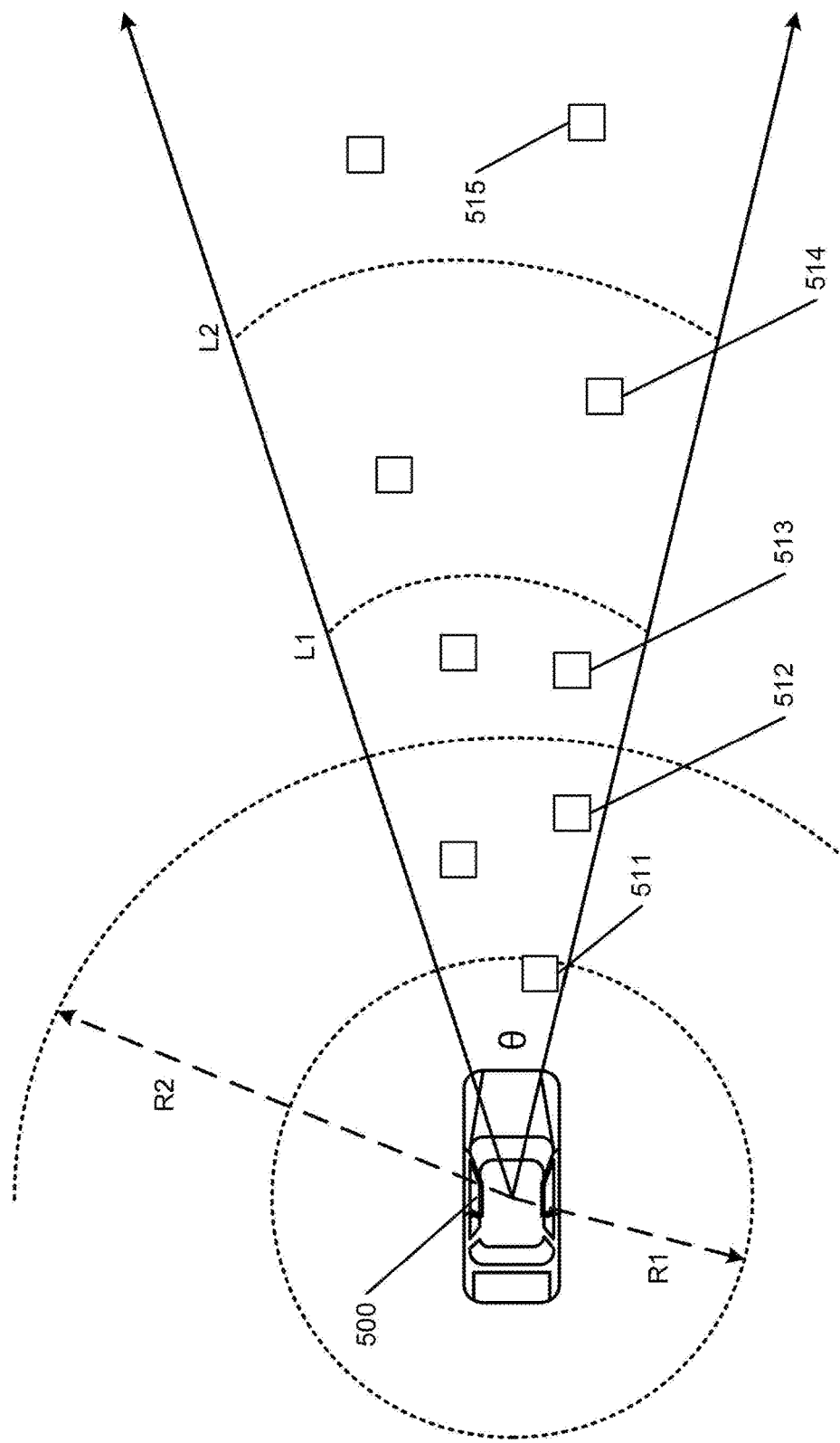
FIG. 5 is a diagram illustrating a process of perception simulation according to one embodiment.

Referring now to FIG. 5, in this example, a set of predefined virtual obstacles as a part of ideal perception is provided at different locations. Each virtual obstacle is represented by a square such as obstacles 511-515. Dependent upon the specific perception sensors, in this example, a RADAR device and a LIDAR device, the corresponding scanning areas or scanning ranges may be different. For example, a RADAR device can be configured to have a scanning radius R1 or R2. A LIDAR device can have a scanning distance L1 or L2, as well as a scanning angle $\theta$. A combination of R, L, and $\theta$ of a RADAR device and a LIDAR device represents a set of perception parameters corresponding to a particular perception range of an ADV on which the RADAR device and LIDAR device are mounted.

In this example, a set of perception parameters can be one of (R1, L1, $\theta$), (R1, L2, $\theta$), (R2, L1, $\theta$), (R2, L2, $\theta$), etc., where $\theta$ can vary as well. For the set of perception parameters (R1, L1, $\theta$), virtual obstacle 511 is visible to the RADAR device, while obstacles 511-513 are visible to the LIDAR device. Virtual obstacles 514-515 are invisible to both RADAR and LIDAR devices because they are located outside of the scanning area. For the set of perception parameters (R2, L2, $\theta$), virtual obstacles 511-512 are visible to the RADAR device and obstacles 511-514 are visible to the LIDAR device. Virtual obstacle 515 is invisible to either RADAR device or LIDAR device.

Note that the visibility of a virtual obstacle is also subject to the perception probability as a part of perception parameters of a perception sensor, which are determined or configured during the design and manufacturing of the perception sensor. For example, if the target perception probability is 90%, there is 90% of the time that a virtual obstacle within the corresponding scanning range is visible to a corresponding perception sensor.

Referring to FIGS. 4A-4B and 5, based on the ideal perception data 421, vehicle states 422, and a given set of perception parameters provided as a part of perception parameters 423, shadow filter 411 is configured to filter out any virtual obstacles that are located outside of the scanning range or scanning area defined by the given set of perception parameters to generate the filtered perception information 430. In one embodiment, shadow filter 411 generates a sequence of perception frames, each frame corresponding to a particular perception image captured by the perception sensors at a particular point in time. Each frame is generated periodically according to a planning cycle of the ADV in question (e.g., 100 to 200 ms). Each frame includes the visible virtual obstacles given the set of perception parameters such as the perception range and perception probability of the perception sensors and vehicle states and driving limitation 422.

Note that although a virtual obstacle may be visible under the given scanning range of perception sensors, such virtual obstacle may not really be visible under the current vehicle states. For example, if the current speed of the ADV is high, a virtual obstacle close to the ADV may not appear in the next frame, because the ADV may have passed the obstacle with the high speed before the next frame is captured. The shadow filter 411 also provides the vehicle states or physical limitation 422 of the ADV to PnC module 412. For a given perception probability (e.g., 90%), only a portion of the perception images corresponding to the perception probability (e.g., 90% of the frames selected randomly or according to a predetermined selection formula) contain the visible virtual obstacles.

Based on the perception information 430 and the vehicle state information 412, PnC module 412 plans a trajectory to control the ADV to navigate through the obstacles observed (e.g., the subset of obstacles filtered). The trajectory may be generated for a particular one of the predetermined driving scenarios 424. PnC module 412 may generate a trajectory for each of the predetermined driving scenarios 424. For each trajectory generated by PnC module 424, simulator 413 performs a simulation by virtually driving the ADV according to the trajectory in view of the virtual obstacles perceived. In such a simulation, the ADV in question is a virtual ADV. Note that simulator 413 and PnC module 412 may be integrated together as an integrated module, where PnC module 412 performs both the planning and simulation operations.

Figure 6:
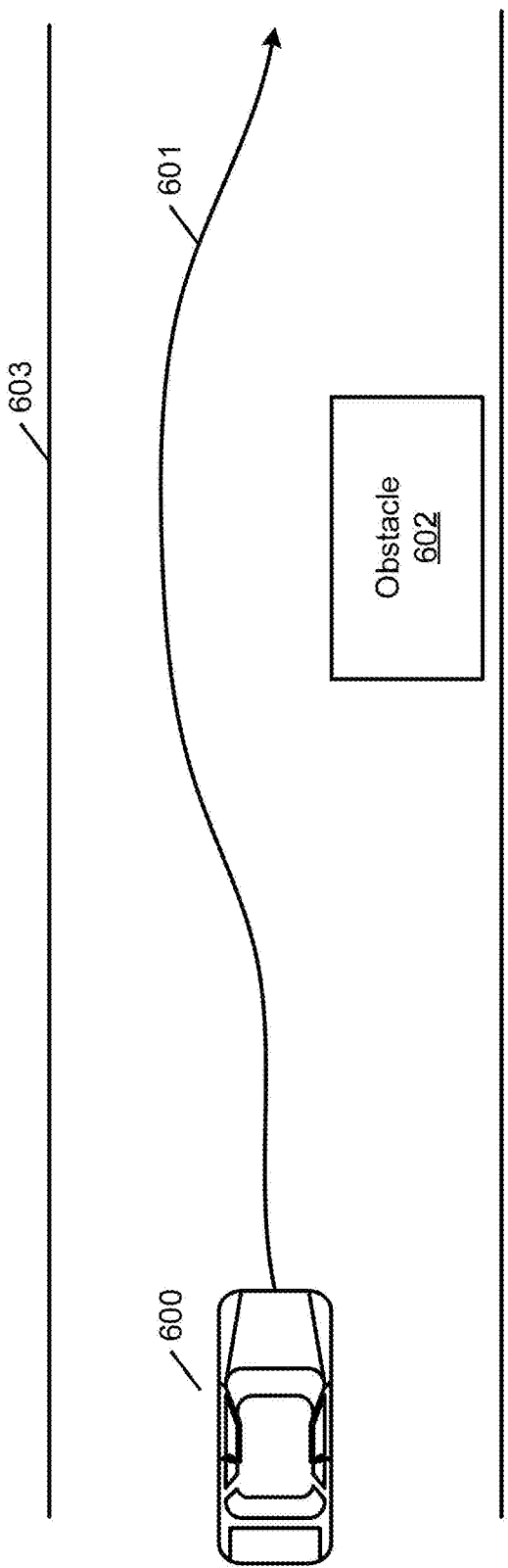
FIG. 6 is a diagram illustrating process of evaluating a simulation according to one embodiment.

For each set of perception parameters (e.g., scanning radius, scanning distance, scanning angle) and for each simulation performed under the corresponding set of perception parameters, evaluation module 414 is configured to examine the corresponding simulation result to determine whether the ADV has successfully navigated through the observed virtual obstacle(s) based on a set of rules 425. For example, as shown in FIG. 6, evaluation module 414 may examine the shortest distance between the trajectory 601 and obstacle 602 to determine whether the distance is below a predetermined threshold, which may be specified as a part of rules 425. The evaluation module 414 may further examines the shortest distance between trajectory 601 and edge 603 of the lane to determine whether such distance is below a predetermined threshold. The simulation fails if any of ADV 600 is too close to obstacle 602 or the edge 603 of the lane. Rules 425 may further specify the minimum relative position within the lane based on the map data and a range of relative speeds between the ADV and the obstacle. Evaluation module 414 may simply indicate whether the simulation has passed in view of the rules 425.

Based on the evaluations of all the simulations performed for all sets of perception parameters, perception range determination module 415 selects one of the sets of perception parameters that all or a significant portion (e.g., compared to a predetermined threshold) of the simulations have passed successfully. The selected set of perception parameters 435 is utilized to identify, acquire, or configure the perception sensors to be utilized on ADVs. Note that evaluation module 414 and perception range determination module 415 may be integrated together as an integrated module.

Figure 7:
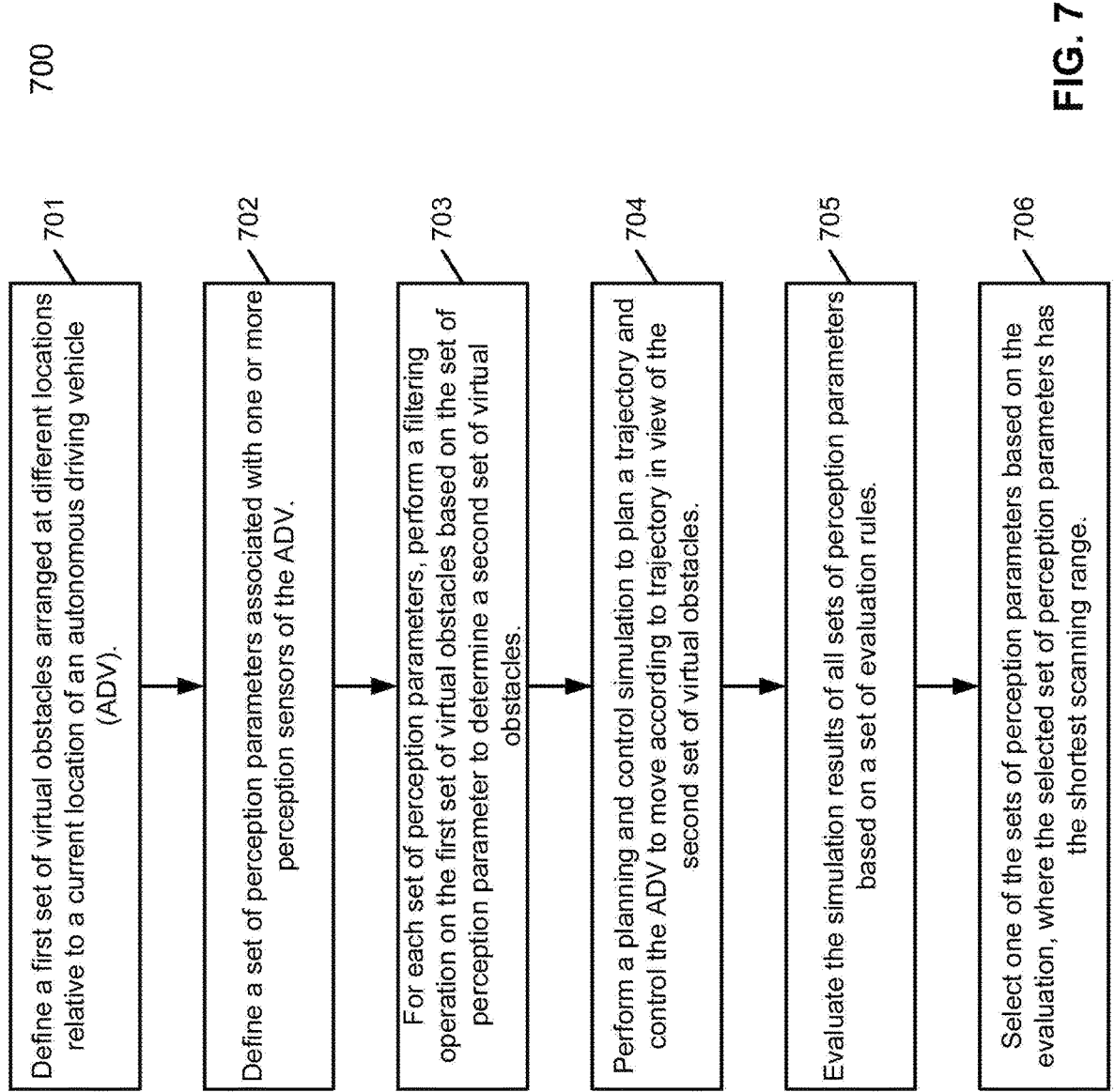
FIG. 7 is a flow diagram illustrating a process of determining perception ranges for autonomous driving according to one embodiment.

FIG. 7 is a flow diagram illustrating a process of determining perception parameters for perception sensors according to one embodiment. Process 700 may be performed by processing logic which may include software, hardware, or a combination thereof. For example, process 700 may be performed by system 400 of FIG. 4A. Referring to FIG. 7, in operation 701, a first set of virtual obstacles are defined that are arranged or disposed at a variety of locations relative to a current location of an ADV as a virtual ADV. In operation 702, a number of sets of perception parameters are defined and associated with one or more perception sensors of the ADV (e.g., RADAR, LIDAR). For each set of the perception parameters, in operation 703, a filtering operation is performed on the first set of virtual obstacles based on the given set of perception parameters, for example, by removing any virtual obstacles from the first set in view of the scanning range defined by the given set of perception parameters, generating a second set of virtual obstacles.

In operation 704, a planning and control simulation is performed to plan a trajectory and control the ADV to move according to the trajectory in view of the second set of virtual obstacles. A number of simulations may be performed for a number of different driving scenarios for each set of perception parameters. In operation 705, the results of the simulations of each set of perception parameters for different driving scenarios are analyzed to determine whether the ADV has successfully navigated the virtual obstacles based on a set of rules. In operation 706, one of the sets of the perception parameters is selected that has the shortest scanning range and a successful simulation rate above a predetermined threshold. The perception parameters are utilized to purchase or configure one or more perception sensors of an ADV subsequently.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 8:
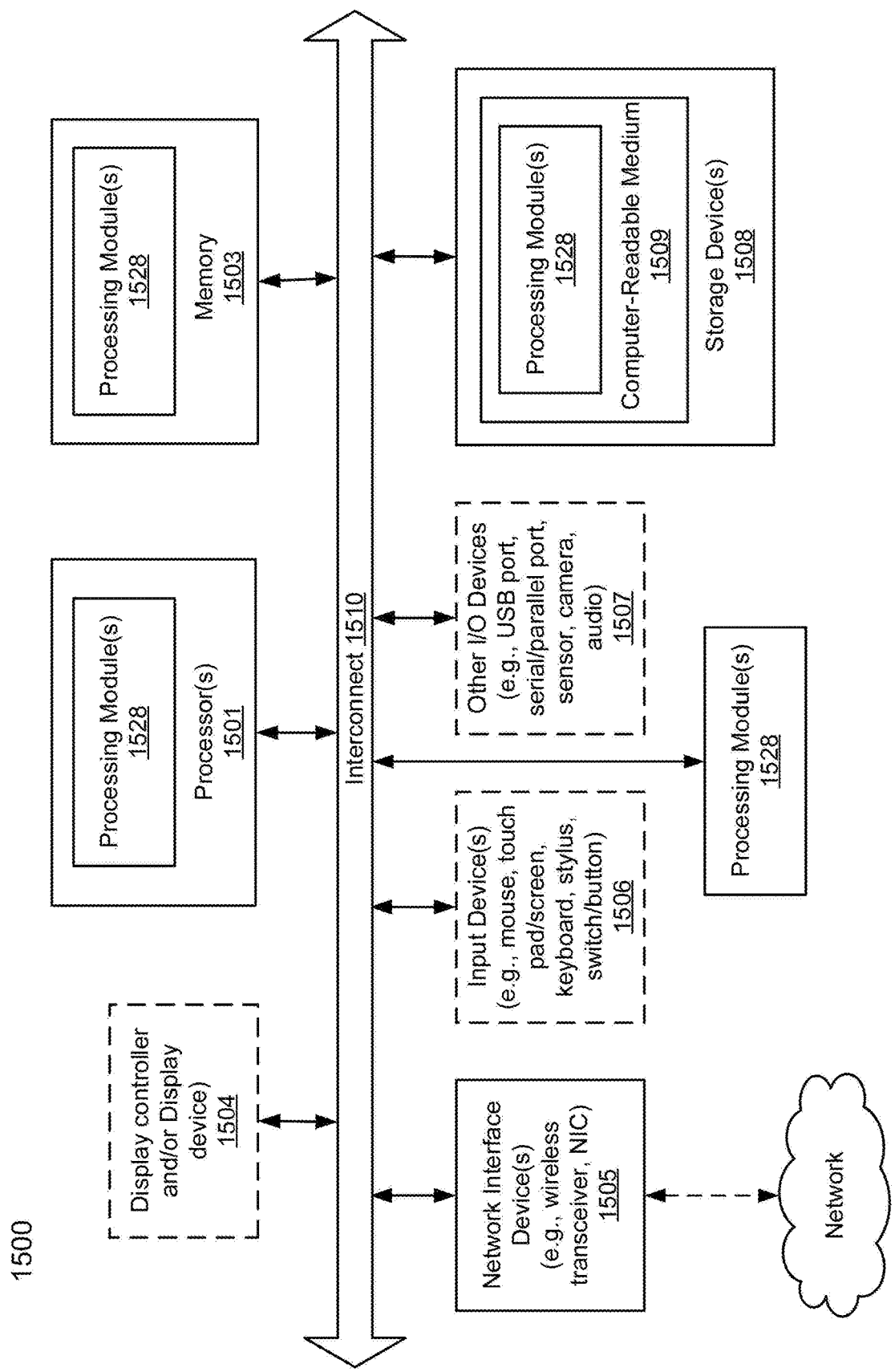
FIG. 8 is a block diagram illustrating a data processing system according to one embodiment.

FIG. 8 is a block diagram illustrating an example of a data processing system which may be used with one embodiment of the disclosure. For example, system 1500 may represent any of data processing systems described above performing any of the processes or methods described above, such as, for example, perception and planning system 110 or any of servers 103-104 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, planning module 305, control module 306, or simulation system 125. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for determining perception ranges required for an autonomous driving vehicle, the method comprising:
   defining a first set of virtual obstacles arranged at a plurality of different locations relative to a current location of an autonomous driving vehicle (ADV);
   defining a plurality of sets of perception parameters associated with one or more perception sensors of the ADV, wherein the perception parameters include a range filter and probability filter;
   for each set of the perception parameters,
      performing a filtering operation on the first set of virtual obstacles based on the set of the perception parameters to determine a second set of virtual obstacles, the second set of virtual obstacles being a subset of the first set of virtual obstacles, wherein the range filter removes one or more virtual obstacles of the first set that are at a distance from the ADV that is larger than a specified distance, and the probability filter removes at least some sensor frames of one or more virtual obstacles of the first set that are at a distance from the ADV that is smaller than a specified distance;
      performing a planning and control simulation to plan a trajectory and control the ADV to move according to the trajectory in view of the second set of virtual obstacle, the planning and control simulation comprising performing simulations for a plurality of different driving scenarios with the set of perception parameters; and determining whether the ADV has successfully navigated the second set of virtual obstacles;

selecting a first set of perception parameters from the plurality of sets of perception parameters that has the shortest scanning range and a successful simulation rate above a predetermined threshold, such that the ADV has successfully navigated through the second set of virtual obstacles, based on the planning and control simulation, wherein the selected first set of parameters are utilized to purchase, or configure, one or more perception sensors of the ADV; and selecting one or more physical perception sensors for use in a real-world ADV based on the selected first set of perception parameters, wherein the real-world ADV is navigated in autonomous driving mode using the one or more physical sensors, and wherein the first set of perception parameters is to be applied to the selected one or more physical perception sensors of the real-world ADV.

2. The method of claim 1, wherein the probability filter further filters out one or more virtual obstacles from the first set of virtual obstacles based upon a current state of the of the ADV, wherein the current state of the ADV includes a heading direction, a position, and a speed of the ADV.

3. The method of claim 1, wherein the selection of the one or more physical sensors is further based on the one or more physical sensors having a lesser cost than one or more different physical sensors having a longer perception range than a perception range of the first set of perception parameters.

4. The method of claim 1, wherein the scanning range is based upon a scanning distance and scanning angle for the perception sensor.

5. The method of claim 1, further comprising, for each set of the perception parameters, evaluating a result of the planning and control simulation based on a set of predetermined rules to determine whether the ADV has navigated through the second set of virtual obstacles successfully, wherein the set of predetermined rules includes a minimum distance between the ADV and each virtual obstacle, a relative position of the ADV within a lane based on map data, and a range of relative speeds between the ADV and each virtual obstacle.

6. The method of claim 1, wherein each candidate set of perception parameters includes a different combination of RADAR scanning radius R of a RADAR device, a LIDAR scanning distance L of a LIDAR device, a LIDAR scanning angle $\Theta$ of the LIDAR device.

7. The method of claim 6, wherein the second set of virtual obstacles are within a scanning area determined based on at least one of the RADAR scanning radius, the LIDAR scanning distance, and the LIDAR scanning angle, while virtual obstacles of the first set outside of the scanning area are removed for the planning and control simulation.

8. The method of 1, wherein the second set of virtual obstacles are selected further based on one or more driving limitations of the ADV.

9. The method of claim 8, wherein the driving limitations of the ADV include at least one of a maximum acceleration, a minimum acceleration, a maximum steering angle changing rate, a minimum turning radius, and a physical dimension of the ADV.

10. A non-transitory machine-readable medium having instructions stored therein, which when executed by a processor, cause the processor to perform operations, the operations comprising:

defining a first set of virtual obstacles arranged at a plurality of different locations relative to a current location of an autonomous driving vehicle (ADV);

defining a plurality of sets of perception parameters associated with one or more perception sensors of the ADV, wherein the perception parameters include a range filter and probability filter;

for each set of the perception parameters,
performing a filtering operation on the first set of virtual obstacles based on the set of the perception parameters to determine a second set of virtual obstacles, the second set of virtual obstacles being a subset of the first set of virtual obstacles, wherein the range filter removes one or more virtual obstacles of the first set that are at a distance from the ADV that is larger than a specified distance, and the probability filter removes at least some sensor frames of one or more virtual obstacles of the first set that are at a distance from the ADV that is smaller than a specified distance;

performing a planning and control simulation to plan a trajectory and control the ADV to move according to the trajectory in view of the second set of virtual obstacle, the planning and control simulation comprising performing simulations for a plurality of different driving scenarios with the set of perception parameters; and determining whether the ADV has successfully navigated the second set of virtual obstacles;

selecting a first set of perception parameters from the plurality of sets of perception parameters that has the shortest scanning range and a successful simulation rate above a predetermined threshold, such that the ADV has successfully navigated through the second set of virtual obstacles, based on the planning and control simulation, wherein the selected first set of parameters are utilized to purchase, or configure, one or more perception sensors of the ADV; and selecting one or more physical perception sensors for use in a real-world ADV based on the selected first set of perception parameters, wherein the real-world ADV is navigated in autonomous driving mode using the one or more physical sensors, and wherein the first set of perception parameters is to be applied to the selected one or more physical perception sensors of the real-world ADV.

11. The machine-readable medium of claim 10, wherein the probability filter further filters out one or more virtual obstacles from the first set of virtual obstacles based upon a current state of the of the ADV, wherein the current state of the ADV includes a heading direction, a position, and a speed of the ADV.

12. The machine-readable medium of claim 10, wherein the selection of the one or more physical sensors is further based on the one or more physical sensors have a lesser cost than one or more different physical sensors have a longer perception range than a perception range of the first set of perception parameters.

13. The machine-readable medium of claim 10, wherein the scanning range is based upon a scanning distance and scanning angle for the perception sensor.

14. The machine-readable medium of claim 10, wherein the operations further comprise, for each set of the perception parameters, evaluating a result of the planning and control simulation based on a set of predetermined rules to determine whether the ADV has navigated through the second set of virtual obstacles successfully, wherein the set of predetermined rules includes a minimum distance between the ADV and each virtual obstacle, a relative position of the ADV within a lane based on map data, and a range of relative speeds between the ADV and each virtual obstacle.

15. The machine-readable medium of claim 10, wherein each candidate set of perception parameters includes a different combination of RADAR scanning radius R of a RADAR device, a LIDAR scanning distance L of a LIDAR device, and a LIDAR scanning angle Θ of the LIDAR device.

16. The machine-readable medium of claim 15, wherein the second set of virtual obstacles are within a scanning area determined based on at least one of the RADAR scanning radius, the LIDAR scanning distance, and the LIDAR scanning angle, while virtual obstacles of the first set outside of the scanning area are removed for the planning and control simulation.

17. The machine-readable medium of 10, wherein the second set of virtual obstacles are selected further based on one or more driving limitations of the ADV.

18. The machine-readable medium of claim 17, wherein the driving limitations of the ADV include at least one of a maximum acceleration, a minimum acceleration, a maximum steering angle changing rate, a minimum turning radius, and a physical dimension of the ADV.

19. A data processing system, comprising:
a processor; and
a memory coupled to the processor to store instructions, which when executed by the processor, cause the processor to perform operations, the operations including
defining a first set of virtual obstacles arranged at a plurality of different locations relative to a current location of an autonomous driving vehicle (ADV),
defining a plurality of sets of perception parameters associated with one or more perception sensors of the ADV, wherein the perception parameters include a range filter and probability filter,
for each set of the perception parameters,
performing a filtering operation on the first set of virtual obstacles based on the set of the perception parameters to determine a second set of virtual obstacles, the second set of virtual obstacles being a subset of the first set of virtual obstacles, wherein the range filter removes one or more virtual obstacles of the first set that are at a distance from the ADV that is larger than a specified distance, and the probability filter removes at least some sensor frames of one or more virtual obstacles of the first set that are at a distance from the ADV that is smaller than a specified distance; and
performing a planning and control simulation to plan a trajectory and control the ADV to move according to the trajectory in view of the second set of virtual obstacle, the planning and control simulation comprising performing simulations for a plurality of different driving scenarios with the set of perception parameters, and
determining whether the ADV has successfully navigated the second set of virtual obstacles;
selecting a first set of perception parameters from the plurality of sets of perception parameters that has the shortest scanning range and a successful simulation rate above a predetermined threshold, such that the ADV has successfully navigated through the second set of virtual obstacles, based on the planning and control simulation, wherein the selected first set of parameters are utilized to purchase, or configure, one or more perception sensors of the ADV; and
selecting one or more physical perception sensors for use in a real-world ADV based on the selected first set of perception parameters, wherein the real-world ADV is navigated in autonomous driving mode using the one or more physical sensors, and wherein the first set of perception parameters is to be applied to the selected one or more physical perception sensors of the real-world ADV.

20. The system of claim 19, wherein the probability filter further filters out one or more virtual obstacles from the first set of virtual obstacles based upon a current state of the of the ADV, wherein the current state of the ADV includes a heading direction, a position, and a speed of the ADV.

* * * * *